Dec. 8, 1936.　　　　A. A. LINSELL　　　　2,063,610
SIGNALING SYSTEM
Filed July 27, 1933　　　　4 Sheets-Sheet 2

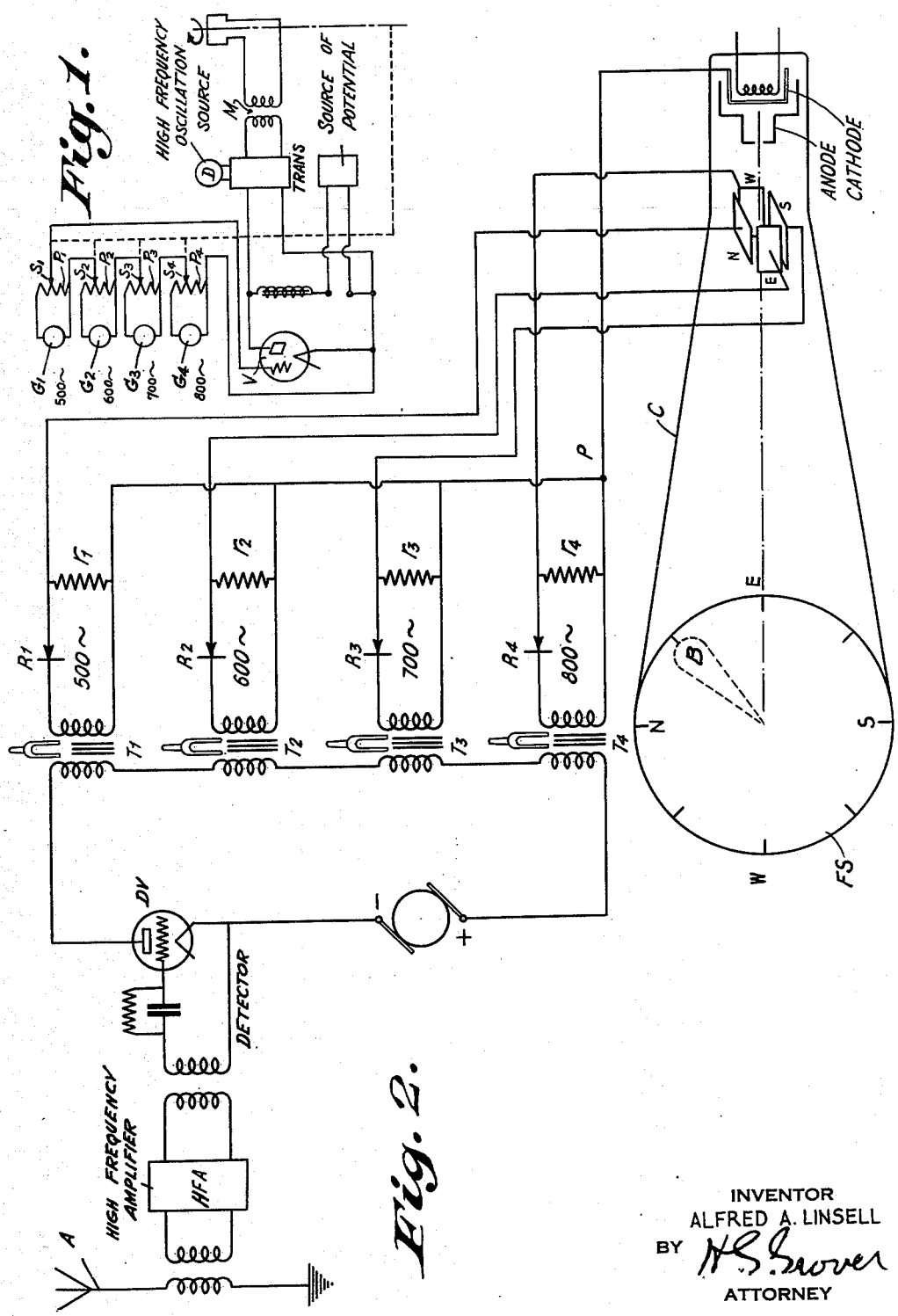

INVENTOR
ALFRED A. LINSELL
BY H. S. Grover
ATTORNEY

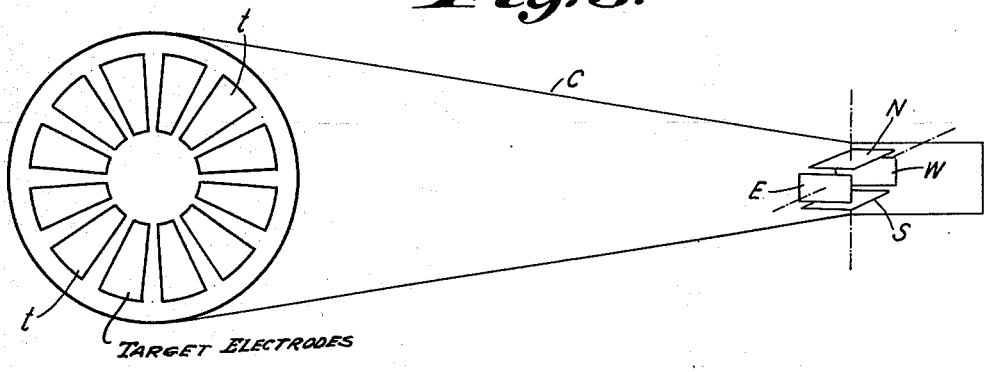
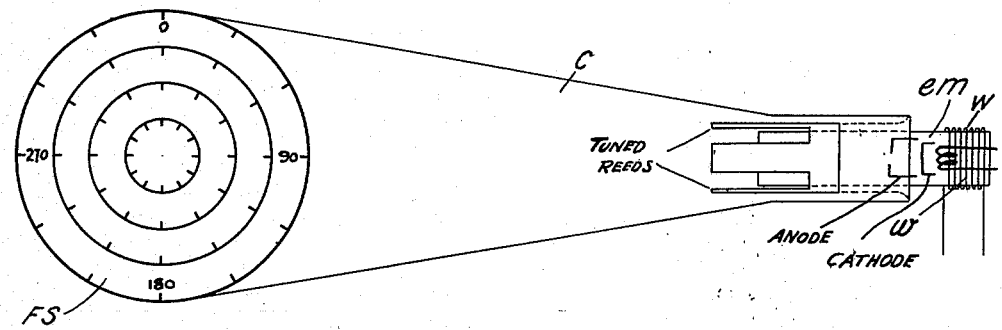
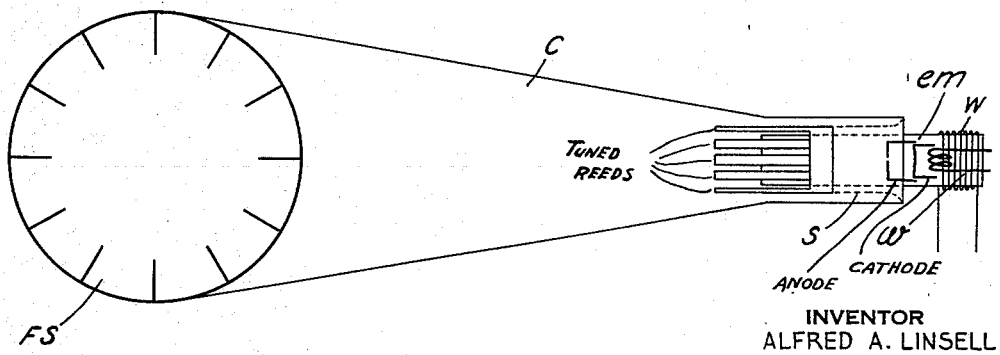

Dec. 8, 1936.  A. A. LINSELL  2,063,610
SIGNALING SYSTEM
Filed July 27, 1933  4 Sheets-Sheet 4

INVENTOR
ALFRED A. LINSELL
BY
ATTORNEY

Patented Dec. 8, 1936

2,063,610

UNITED STATES PATENT OFFICE 2,063,610

SIGNALING SYSTEM

Alfred Aubyn Linsell, London, England, assignor to Radio Corporation of America, a corporation of Delaware Application July 27, 1933, Serial No. 682,415
In Great Britain July 28, 1932

9 Claims. (Cl. 250—11)

This invention relates to radio signaling systems, and has for its object to provide an improved signaling system wherein a visual indication is given at the receiver of information which it is desired to convey, said visual indication being such that it may be easily and rapidly read, and does not necessitate the knowledge of any code, such as a "Morse" code, on the part of an observer for whom the information is intended.

Although by no means limited thereto one of the principal applications of the invention is to direction finding or direction indicating systems whether of the "radio beacon" type, by which expression is meant a transmitter emitting a directional beam which is rotated about the transmitter, or of the type wherein a signal is broadcast by a transmitter the bearing of said transmitter with respect to a receiver being in this case determined by a directional receiver.

The invention may however be employed for the conveying of any desired information and a further important application is concerned with the transmission by wireless to aircraft and the like of information relating to such matters as weather conditions, and in carrying out the invention a "picture" or visual indication of the message transmitted which may comprise a plurality of items of information is received but without the complications and synchronizing difficulties of a television or facsimile telegraph system.

According to one feature of the invention there is provided at the transmitter means for generating a plurality of different modulating, e. g. note, frequencies and means for separately adjusting the amplitudes thereof between zero and a predetermined maximum, and the adjusted modulating frequency amplitudes are utilized to modulate a transmitted carrier wave, the relative proportions of the modulating note frequencies determining the information it is desired to convey. The receiver is provided with means responsive to the relative amplitudes of the modulating frequencies for controlling indicating means in dependence upon the said relative strengths of said frequencies.

According to a further feature of the invention, the indicating means employed at the receiver comprises a cathode ray tube and means for applying control potentials thereto in dependence upon the strength of the received modulating frequencies for controlling the direction of the cathode ray. The cathode ray tube may be provided with a single target in the form of a fluorescent screen marked in any desired manner, the cathode ray producing a luminous indication against any predetermined mark or scale in accordance with the signal transmitted. Alternatively a plurality of targets, each associated with a relay device, may be employed, said relay device being actuated to give a visual indication when the cathode ray impinges upon the appropriate target.

Various embodiments of the invention are illustrated schematically in the accompanying drawings, in which;

Figure 2 illustrates the essential features of a receiver by means of which waves sent out by the transmitter of Figure 1 may be received.

Figures 3 to 5 inclusive illustrate modifications of the cathode ray tube included in the receiver of Figure 2.

Figure 1A:
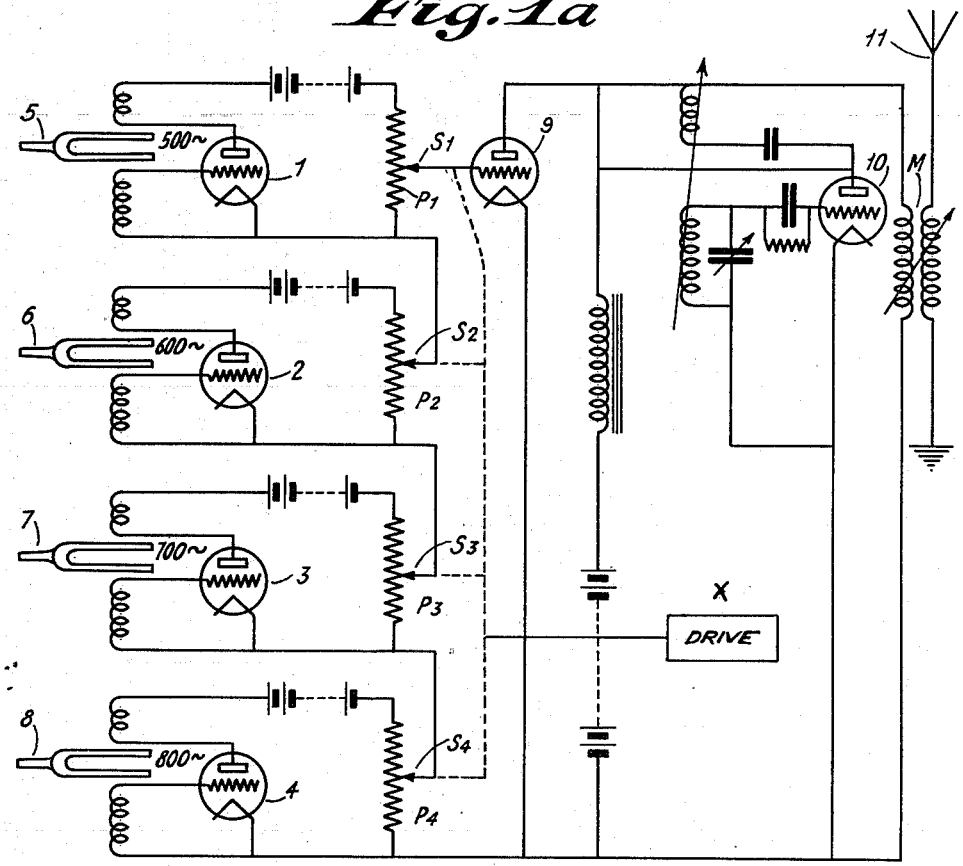
Figure 1 illustrates schematically the essential features of a transmitter arranged in accordance with my invention.
Figure 1B:
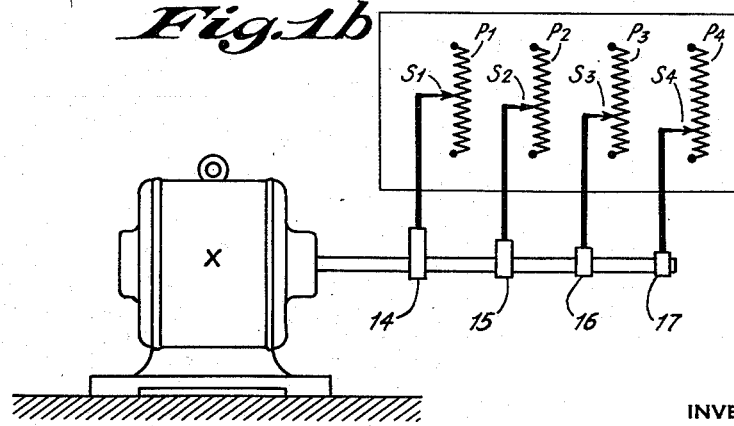
Figure 6:
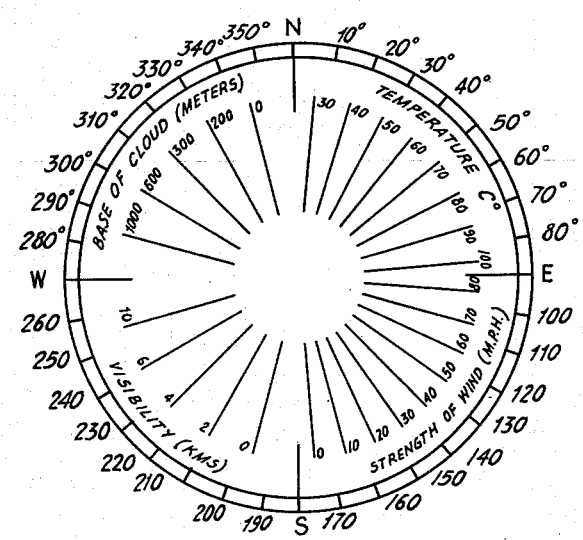
Figure 7:
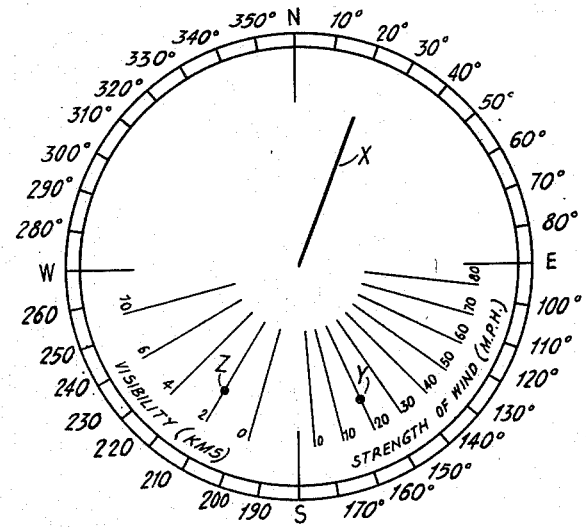

Figures 6 and 7 illustrate modifications of the fluorescent screen or target of the prior cathode ray tubes; while, Figures 1a and 1b illustrate a modification of the transmitter of Figure 1.

In accordance with the first embodiment to be described a radio beacon system of direction indication comprises at the transmitter means for modulating a continuously rotated beam of radiated carrier energy by a different combination of a plurality of note frequencies for each instantaneous position of the beam. In the particular arrangement now under consideration only four modulating frequencies are required and the carrier wave is modulated at any instant with a combination of two of said frequencies in predetermined power ratios depending upon the instantaneous position of the beam. For example, when the beam is in the quadrant between the compass points north and east the transmitter is modulated by a combination of two note frequencies of 500 and 600 cycles respectively the power ratio of 600 cycle modulation to 500 cycle modulation being equal to the tangent of the angle through which the beam, assuming clockwise rotation, has rotated from north. When the beam is pointing due north the value of the 600 cycle modulation will be zero and the value of 500 cycle modulation a maximum. Similarly when the beam is pointing due east the value of the 500 cycle modulation will be zero and that of the 600 cycle modulation a maximum. For the second quadrant between the cardinal points east and south the transmitter is modulated in a similar manner by a combination of, say, 600 and 700 cycles, for the third quadrant between South and West by a combination of, say, 700 and 800 and for the fourth quadrant between West and North by a combination of 800 and 500 cycles.

An arrangement whereby the transmitter may be modulated as above described is illustrated schematically in the accompanying Figure 1 wherein $G_1$, $G_2$, $G_3$, $G_4$ are four note frequency generators providing modulating frequencies of 500, 600, 700, and 800 cycles respectively. Potentiometers $P_1$, $P_2$, $P_3$, $P_4$ are connected across said generators and in series with one another as shown between the grid and cathode of a valve V connected for choke modulation of a transmitter T coupled at M to a suitable rotating beam aerial (not shown). D represents the high frequency energizing source for the transmitter T. The sliding contacts of the potentiometers may be actuated automatically under the control of the rotating beam aerial for obtaining the required combination of audio frequencies in the appropriate ratios corresponding to the instantaneous position of the beam.

At the receiver the signals are amplified and detected in any convenient manner well known per se and are utilized to give a direct visual indication of the bearing of the receiver with respect to the transmitter. A suitable form of receiving apparatus for achieving this result is illustrated schematically in the accompanying Figure 2, a modified indicating arrangement being shown in Figure 3.

Referring to Figure 2, a non-directional receiving aerial A is shown coupled to a high frequency amplifier HFA in turn coupled to a detector valve DV in whose anode circuit are connected in series with one another the primaries of four transformers $T_1$, $T_2$, $T_3$, $T_4$ whose primary and secondary windings are coupled by means of vibrating reeds or tuning forks whose natural frequencies are 500, 600, 700, and 800 cycles respectively. These transformers thus constitute selector circuits for the four modulating frequencies and the secondary windings of the said transformers are connected as shown through rectifiers $R_1$, $R_2$, $R_3$, $R_4$ across resistances $r_1$, $r_2$, $r_3$, $r_4$. Any means for indicating the energy dissipated in the resistances $r_1$, $r_2$, $r_3$, $r_4$ may be used. Preferably the negative end of each of the resistances may be connected as shown in Figure 2 to a common point P while the positive ends thereof are connected as shown to four electrostatic deflecting plates N, E, S, W of a cathode ray oscillograph tube C. The common point P is connected to the cathode point of the tube C. One suitable form of cathode ray tube is illustrated diagrammatically in Figure 2 and comprises the usual cathode and accelerating elements of an electron "gun", two pairs of electrostatic deflecting electrodes NS, EW for controlling the cathode ray and a fluorescent screen FS formed in the end of the tube and marked with the points of the compass. The deflector electrode N associated with the 500 cycle frequency selective circuit $T_1$, $R_1$, $R'$ is positioned to attract or deflect the cathode ray towards that part of the fluorescent screen marked "North", the electrode E associated with the 600 cycle frequency selective circuit $T_2$, $R_2$, $r_2$ towards that part marked "East" and so forth to correspond to the directions assigned to the different frequencies at the transmitter.

It will be obvious that the potential drop across any resistance will be proportional to the strength of the particular audio frequency occurring in the selector circuit with which the resistance is associated and that the direction of deflection of the cathode ray will therefore be dependent upon the relative strengths of the incoming audio frequencies.

Assuming for the moment that the radiated energy were received at constant strength throughout the complete cycle of rotation of the beam, the cathode ray at the receiver would be deflected to produce a luminous spot upon the fluorescent screen which spot will travel round a circle in synchronism with the rotation of the beam. In view, however, of the fact that the received signal strength will be a maximum at the instant the beam passes through the receiving station and will rapidly fall off substantially to zero during the greater part of the cycle of rotation and will rise again to a maximum as the beam again passes through the receiving station, it will be obvious that the curve traced out by the luminous spot will be lobar in shape and that that point on the curve which is nearest the periphery of the fluorescent screen will give a direct reading of the bearing of the beacon station. The approximate shape of the curve so traced is shown in dotted lines at B in Figure 2.

The same general type of receiver indicator may also be employed, though with different markings, to enable an aircraft not carrying a Morse code operator to ascertain the identity of a beacon station of the non-directional type whose bearing has been found by the usual direction finding method. To this end the invention envisages characterizing beacon stations by modulating the carrier wave of each of a plurality of beacon stations of the broadcast or non-directional type with a combination of two audio frequencies in a fixed predetermined ratio. As before, four frequencies can be used and any two combined in different degrees of power to identify the different stations.

The cathode ray tube at the receiver will be substantially as previously described, but the fluorescent screen will be marked about its periphery with the names of the various beacon stations in positions corresponding to the direction in which the cathode ray is deflected in accordance with the modulation frequencies of the appropriate station.

An alternative form of cathode ray tube to that shown in Figure 2 is shown diagrammatically in Figure 3 wherein in place of a fluorescent screen a plurality of radially disposed target electrodes $t$ is employed each appropriate to a particular transmitting station. A suitable relay, not shown, is connected in circuit with each target whereby said relay is actuated by the cathode ray impinging upon the associated target in accordance with received signals as already described. The relay may take the form of a neon lamp giving a direct visual indication or may be utilized to actuate any desired form of indicator.

An alternative form of indicating cathode ray device which renders the use of separate frequency selective circuits unnecessary is shown diagrammatically in the accompanying Figure 4 and comprises a cathode ray tube C into the usually provided re-entrant tubular stem $s$ of which is inserted one end of an electromagnet $em$ whose winding $w$ is fed directly with the demodulated received signals. Mounted on the "pinch" of the cathode ray tube are the usual elements of an electron "gun" and surrounding the latter is a plurality of tuned reeds of magnetic material arranged parallel to the axis of the tube. In the particular arrangement illustrated four of these reeds are provided tuned to 500, 600, 700, and 800 cycles and positioned 90° apart about a circle whose center is on the axis of the tube. A suitably marked fluorescent screen FS is provided at the end of the tube and for convenience this may be marked with a plurality of concentric circles each having a scale of degrees, the points of the compass or the names of stations indicated thereon. A suitable bias potential is supplied to the series of reeds which then acts as a series of deflection plates for the cathode ray.

Provided that all of the reeds are at rest the net deflection produced on the cathode ray will be nil, but if one or more of the reeds vibrate in response to an incoming signal the cathode ray will be vibrated towards such reed or reeds. Thus if the incoming signals after demodulation contain at a given instant frequencies of 500 and 600 cycles at relative strengths of say 3:1 the reeds tuned to these frequencies would be set into vibration by the electromagnet $em$ the 500 cycle reed vibrating at substantially three times the amplitude of vibration of the 600 cycle reed and the ray would therefore be deflected along a path on the fluorescent screen bearing an angle whose tangent is 1/3 to the indication thereon corresponding to 500 cycles. This last described arrangement is particularly adapted for giving an indication of the name of any of a plurality of unknown transmitting stations modulated with predetermined combinations of frequencies as a means of identification and the cathode ray tube may be provided either with a fluorescent screen marked with the names of such stations or with a plurality of targets each appropriated to a given station and associated with a relay as in the previously described arrangement.

In a modification of the last described system, wherein non-directional beacon stations are each modulated with a characteristic modulating frequency combination, each station transmits a carrier modulated with a single note frequency, e. g. 50, 60, 70, or 80 cycles, and so forth, the output from the detector at the receiver being fed to the coil $w$ of an electromagnet $em$ symmetrically disposed with relation to a plurality of corresponding tuned reeds, each reed having a natural frequency corresponding to the modulating frequency characteristic of one of the stations in question. The reeds may be associated with a suitable dial marked opposite each reed with the name of the appropriate station to give a direct visual indication of the station being received or they may be utilized to control the deflection of the cathode ray of a cathode ray tube as above described with the exception that in this case a separate tuned reed corresponding to each station would be provided for the deflection of the cathode ray. This last arrangement is convenient where only a relatively small number of stations is in question. One such form of cathode ray tube is illustrated diagrammatically in the accompanying Figure 5 wherein similar reference letters are employed to those in Figure 4 and it is thought that a detailed description of this device will be unnecessary. The tube may be provided either with a fluorescent screen marked with the names of the transmitting stations or with a plurality of targets and associated relays as before.

The application of the invention to the transmission of information relating to weather conditions is illustrated in the accompanying Figure 6 which shows the method of marking the fluorescent screen of the indicating cathode ray tube at the receiver. Figure 7 is similar to Figure 6 and shows the type of indication which is given.

It is assumed in connection with this application that it is desired to transmit to an aircraft the following five items of information simultaneously:
(1) The direction of the wind.
(2) The force of the wind.
(3) Visibility.
(4) Base of cloud.
(5) Temperature.

Referring to Figure 6 it will be seen that one quadrant is marked with a "base of cloud" scale having radial divisions numbered, say, 0–1000 meters. A second quadrant is marked with a "temperature" scale having radial divisions numbered, say, 30°–100° F. A third quadrant is marked with a "strength of wind" scale having radial divisions numbered, say, 0–80 miles per hour, while the fourth quadrant is marked with a visibility scale having radial divisions numbered, say, 0–10 kilometers. Arranged about the periphery of the end wall of the tube and surrounding the above scales is a fifth scale marked with the cardinal points of the compass N. E. S. W. and having divisions numbered 0°–360° for indicating the direction of the wind.

By means to be described later, the cathode ray is deflected to cause a luminous spot to appear in each quadrant of the fluorescent screen to indicate the appropriate scale division. Indication of the appropriate division on the outer circular scale is effected by oscillating the cathode ray to produce a radial line of light opposite said division. In this way an indication appropriate to the outer scale is distinguished from those appropriate to the inner scales in four quadrants. In practice the five indications are repeated one after the other in rapid succession, so that as a result of persistence of vision, the indications appear to the eye to be effected simultaneously and continuously.

Figure 7 shows the manner in which various indications appear on the fluorescent screen, X being the indication appropriate to the outer scale of wind direction, Y the luminous spot indicating the strength of wind and Z the luminous spot indicating visibility. Base of cloud and temperature are indicated in a similar manner to strength of wind and visibility, but the former scales have been omitted from Figure 7 for the sake of clarity.

The required information is sent out from a radio transmitter whereof the high frequency carrier is modulated with a combination of two note frequencies in predetermined power ratios for each item of information. As in the first described arrangement, only four modulating frequencies are required from which the required pair of frequencies is selected. These audio frequencies are separated out at the receiver and applied to the cathode ray tube in such manner that the ray is deflected on the fluorescent screen to the appropriate mark concerned.

Considering first the indication relating to the direction of the wind: If the wind is due north, the transmitter is modulated with a frequency of, say, 500 cycles. If the wind is due east, the transmitter is modulated with a frequency of, say, 600 cycles; if due south, say, 700 cycles; and if due west, say, 800 cycles. For any direction between north and east the transmitter is modulated with a combination of the 500 cycle and 600 cycle modulation frequencies, the ratio of 600 cycle modulation to 500 cycle modulation being equal to the tangent of the angle between the direction to be indicated and north. Thus, for due north, the transmitter may be regarded as modulated with two frequencies of 500 and 600 cycles per second, the latter being of zero amplitude, while for due east the former frequency is of zero amplitude. Similarly for directions between east and south, the transmitter will be modulated with a combination of 600 cycle and 700 cycle modulation frequencies, and so on for the remaining quadrants. The oscillation of the cathode ray to produce a radial line of light on the fluorescent screen, whereby the transmitted direction is indicated, is effected, in a manner to be described later, by varying the total amount of high frequency energy radiated from the transmitter, thereby causing the cathode ray to travel back and forth along the said line at a speed such as to make the radially moving spot appear as a line.

The other items of information are transmitted in regular succession in a similar manner, the temperature, say, being indicated by a combination in appropriate ratio of 500 and 600 cycles. For extreme values one frequency may be of zero amplitude. The strength of wind may be indicated by an appropriate combination of 600 and 700 cycles, the visibility by a suitable combination of 700 and 800 cycles, and the base of cloud by a combination of 800 and 500 cycles.

The apparatus at the transmitter is substantially the same as in the first arrangement herein described and illustrated in Figure 1 with the exception that the said transmitter is a non-directional or broadcast transmitter and not a radio beam radiating a rotating directional beam. The transmitter may comprise as shown in Figure 1a a plurality of sources of tone frequencies 1 and 5, 2 and 6, 3 and 7, 4 and 8, connected as shown by variable coupling means $P_1$, $P_2$, $P_3$, $P_4$ to the control grid of a thermionic relay 9, the anode electrode of which draws its current from a source which also supplied current to the anode circuit of an oscillation generator 10 of the regenerative type. The oscillations produced in 10 and modulated by the desired tone frequencies in the desired ratio are impressed by way of the variable coupling 12 on a radiating system 11.

The potentiometer sliders, Figures 1 and 1a, may be actuated automatically, e. g. electrically, under the control of a wind vane for obtaining the required combination of audio frequencies in the appropriate ratios corresponding to the direction of the wind. The potentiometer sliders S1, S2 etc. may also be operated as shown in Figure 1b by a motor M1 acting through cams 14 to 17 inclusive. The cams may be shaped and staggered to produce the desired result. In like manner, where convenient, the control of the appropriate potentiometer may be effected automatically for the other items of information, e. g. by a thermometer for temperature indication. The power radiated may be fluctuated for the purpose of oscillating the cathode ray at the receiver to produce a "line" indication for the direction of wind reading in any convenient way, for example, by varying the coupling M of Figure 1a between the transmitter and the transmitting antenna or by applying an alternating potential to the grid of one of the transmitter power amplifying valves.

The apparatus at the receiver is the same as that shown in Figure 2 with the exception that the fluorescent screen is marked as indicated in Figures 6 and 7.

Having now particularly described and ascertained the nature of my said invention and in what manner the same is to be performed, I declare that what I claim is:

1. A radio beacon system comprising means for radiating a continuously rotating beam of carrier wave energy, means for simultaneously generating a plurality of different modulating frequencies, means for modulating the radiated carrier wave energy by a combination of two of said modulating frequencies, in a strength ratio dependent upon the instantaneous position of the beam and receiving means including a cathode ray tube having a fluorescent screen and horizontal and vertical deflecting circuits operative in dependence upon the relative strengths of said modulating frequencies for producing an indication upon said screen.

2. A radio beacon system as claimed in claim 2 and in which the carrier wave energy is modulated by the combination of a pair of frequencies appropriate to and characteristic of each quadrant through which the beam passes the two frequencies of each pair being combined at any instant in a strength ratio which varies as said beam moves through said quadrant so that said strength ratio is characteristic of the instantaneous position of said beam in said quadrant.

3. Transmitting means comprising a plurality of sources of modulating potentials of different frequencies, a thermionic relay tube having an anode, control grid and cathode, variable coupling means between each of said sources and the control grid and cathode of said relay tube, selected pairs of said coupling means being variable in opposite senses, transmitting means including a source of local oscillations on which said modulating potentials are impressed coupled with the anode and cathode of said tube, directional radiating means coupled to said transmitting means, and means for rotating said radiating means and simultaneously varying said coupling means.

4. Signaling means including four sources of modulating potentials of frequencies which differ by a like amount, a thermionic relay tube having an anode, a cathode and a control grid, a variable impedance coupling each of said sources to the control grid and cathode of said tube, the first and second, second and third, third and fourth, and fourth and first of said impedances being variable in opposite sense, transmitting means including a source of local oscillations connected to the anode and cathode of said tube, directional radiating means coupled to said transmitting means, and means for rotating said radiating means and simultaneously controlling said impedances.

5. Transmitting means comprising a plurality of sources of modulating potentials, a potentiometer connected in parallel with each source, a thermionic relay tube, a connection between the control grid of said tube and a point on the first of said potentiometers, a connection between a point on a second potentiometer and the terminal of said first potentiometer, a connection between the terminal of said second potentiometer and a moving point on a third potentiometer, a connection between the terminal of the third potentiometer and a moving point on a fourth potentiometer, a connection between the terminal of said fourth potentiometer and the cathode of said tube, transmitting means including a source of local oscillations on which said modulating potentials are impressed, directional radiating means coupled to said transmitting means, and means for rotating said radiating means and simultaneously moving said points along said potentiometers.

6. In a signal receiving system, signal absorbing means, a thermionic demodulator tube having an input circuit coupled to said signal absorbing means, a plurality of mechanical devices each tuned to a different modulating frequency, each device comprising an input winding and an output winding and a frequency stabilizing element associated with said windings, a circuit connecting said input windings in series between the output electrodes of said tube a rectifier in series with each of said output windings, a cathode ray tube, a connection between one terminal of each of said rectifiers and the cathode of said cathode ray tube, said cathode ray tube having a plurality of pairs of deflecting plates and a connection between the free terminal of each of said rectifiers and one of said deflecting plates.

7. In a signaling system, signal absorbing means, signal amplifying means coupled to said absorbing means, a thermionic demodulator tube having an input circuit coupled to said signal amplifying means, a plurality of mechanical vibratory devices each tuned to a different modulating frequency, each device comprising an input winding and an output winding, a circuit connecting said input windings in series between the output electrodes of said tube, a rectifier and a resistance connected in series with each of said output windings, a cathode ray tube, a connection between one terminal of each of said resistances and the cathode of said cathode ray tube, said cathode ray tube having a plurality of pairs of deflecting plates and a connection between the free terminal of each of said resistances and one of said deflecting plates.

8. Transmitting means comprising a plurality of sources of alternating current of tone frequency, said frequencies increasing progressively from the first source to the last source, a potentiometer connected in parallel with each of said sources, a thermionic tube having anode, cathode and control grid, a connection between the movable point on each said potentiometer and the control grid of said tube, means for connecting in series the several potentiometer portions which lie between the movable points and the corresponding terminals of each potentiometer, the terminal of the last potentiometer being connected to the cathode of said tube, an oscillation generator having an energizing circuit coupled with the anode circuit of said first named tube, radiating means, a variable coupling between said radiating means and the output circuit of said oscillation generator, and means for moving selected pairs of the points on said potentiometers in opposite directions.

9. A transmitter comprising a plurality of sources of alternating current of tone frequency, said frequencies increasing progressively from the first source to the last source, a thermionic tube having an anode, a cathode and a control grid, a variable coupling device between the output of each of said sources and the control grid and cathode of said tube, means for varying the degree of effectiveness of each of said coupling devices and for producing such variations simultaneously in opposite senses with respect to any two of said devices, an oscillation generator having an anode energizing circuit in common with the anode circuit of said first named tube, radiating means, and a variable coupling between said radiating means and the output circuit of said oscillation generator.

ALFRED AUBYN LINSELL.